United States Patent [19]

Grzych

[11] Patent Number: 5,183,169
[45] Date of Patent: Feb. 2, 1993

[54] REUSABLE BOTTLE HANDLE

[76] Inventor: Stephen D. Grzych, S&R Enterprises, P.O. Box 366, Cedar Lake, Ind. 46303

[21] Appl. No.: 715,497

[22] Filed: Jun. 14, 1991

[51] Int. Cl.$^5$ .............................................. B65D 23/10
[52] U.S. Cl. ...................................... 215/100 A; 220/741; 220/742; 294/31.2; 294/33
[58] Field of Search .................. 215/100 R, 100 A; 220/94 R, 741, 742; 294/27.1, 31.2, 33

[56] References Cited

U.S. PATENT DOCUMENTS

| | | | |
|---|---|---|---|
| 547,713 | 10/1895 | Courtenay | 294/33 X |
| 622,862 | 4/1899 | Pierce | 215/100 A X |
| 2,075,217 | 3/1937 | Milburn | 215/100 A |
| 2,147,758 | 2/1939 | Schneider et al. | 215/100 R X |
| 2,524,639 | 10/1950 | Saunders | 215/100 A X |
| 2,930,502 | 3/1960 | Klein | 215/100 A |
| 3,021,026 | 2/1962 | Clare | 215/100 A |
| 3,116,947 | 1/1964 | Brownrigg | 294/31.2 |
| 3,353,729 | 11/1967 | Hull | 294/31.2 X |
| 3,794,370 | 2/1974 | Lockhart et al. | 215/100 A X |
| 4,627,546 | 12/1986 | Carranza | 215/100 A |
| 4,660,876 | 4/1987 | Weldin et al. | 294/31.2 X |
| 4,666,197 | 5/1987 | Watson et al. | 294/31.2 |
| 4,667,359 | 5/1987 | Pocotti | 294/31.2 X |
| 4,724,971 | 2/1988 | Henline | 215/100 A |
| 4,896,913 | 1/1990 | Kennedy | 220/94 R X |
| 4,928,873 | 5/1990 | Johnson | 294/31.2 X |
| 5,013,074 | 5/1991 | Galle | 215/100 A X |
| 5,025,940 | 6/1991 | Akly | 220/94 R X |

FOREIGN PATENT DOCUMENTS

| | | | |
|---|---|---|---|
| 500360 | 6/1930 | Fed. Rep. of Germany | 215/100 A |
| 811199 | 4/1937 | France | 294/33 |
| 2621890 | 4/1989 | France | 294/33 |
| 159148 | 6/1957 | Sweden | 215/100 A |
| 919799 | 2/1963 | United Kingdom | 215/100 A |
| 2128878 | 5/1984 | United Kingdom | 294/31.2 |

*Primary Examiner*—Sue A. Weaver
*Attorney, Agent, or Firm*—Wood, Phillips, VanSanten, Hoffman and Ertel

[57] ABSTRACT

A reusable handle for use with bottles is disclosed. The handle has an upwardly diverging bonnet shaped jacket which encircles and holds a portion of the bottle body. An arm, with a gripping portion, extends from the jacket and terminates in a bottle neck ring which holds the bottle neck. The bottle neck ring has a neck locking tab and an opposing straight edge which firmly hold the bottle neck. The neck locking tab and shape of the jacket also serve to bias the gripping portion of the handle away from the bottle body. Because of the tapered jacket, the handle can be used with a bottles having varying diameters. The handle can also be made, sold and stored in a flat configuration. In the flat configuration, the handle has a planar body with an arcuate bottom edge and side edges which can be attached together for use to form the upwardly diverging bonnet shape of the jacket.

19 Claims, 2 Drawing Sheets

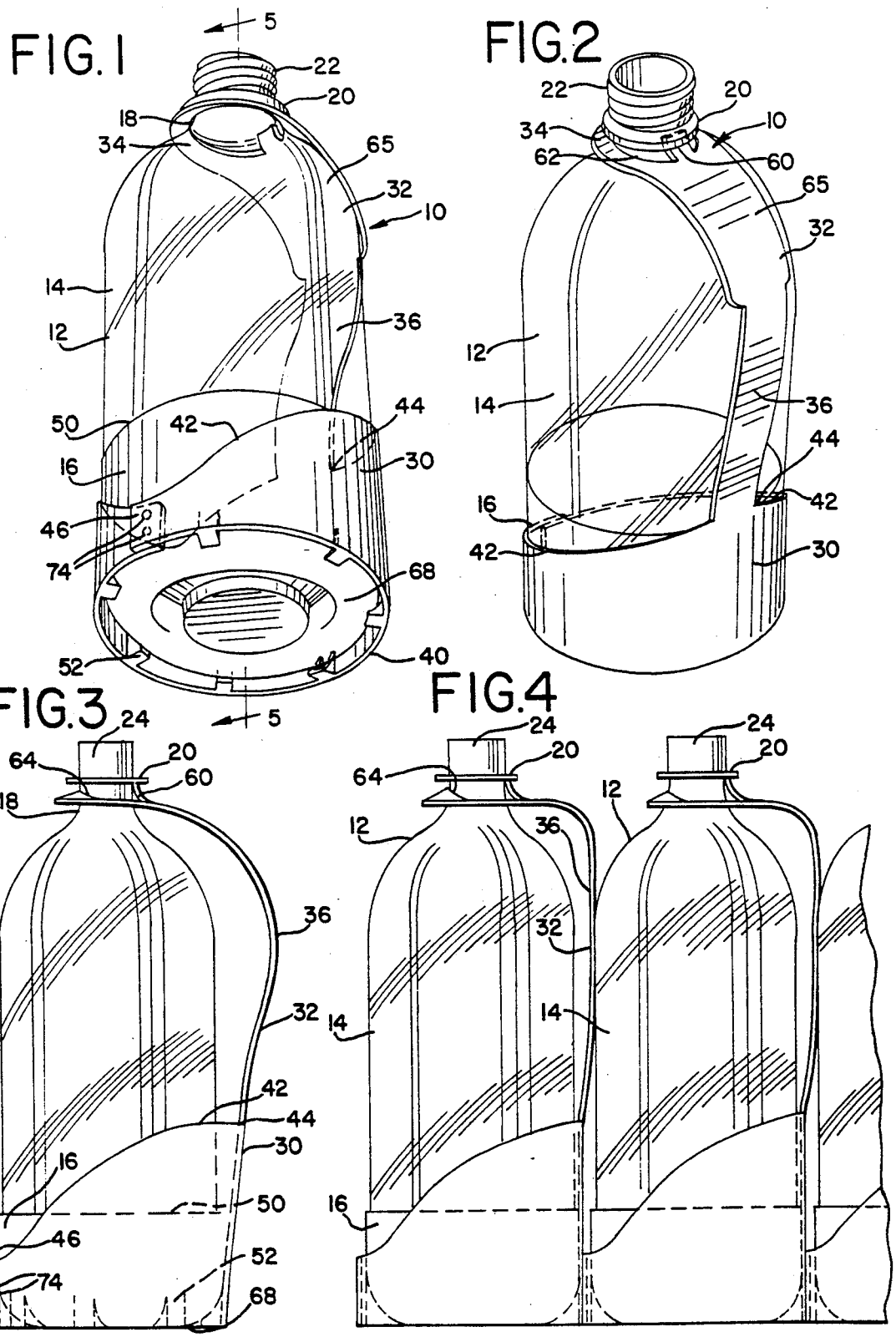

5,183,169

REUSABLE BOTTLE HANDLE

BACKGROUND OF THE INVENTION

The present invention relates to reusable handles to be used with bottles. More particularly, the invention relates to flexible handles useful for handling the plastic bottles in which soft drinks are sold. Such bottles typically have a flanged neck, and are typically sold in two or three liter sizes. These two and three liter size plastic bottles present handling problems for the consumer.

The weight and circumference of the bottles make them difficult to grasp and handle, particularly for children. Consequently, many children are unable to serve themselves drinks from the bottles. Even for adults with larger hands, the circumference of these bottles is great enough to make handling difficult. This problem is often exasperated when the bottle is wet, for the bottle then becomes slippery as well. Furthermore, the walls of such bottles are typically thin, and permit the bottle to collapse when the cap is off and pressure applied around the body during pouring.

Solutions have been proposed for handling such bottles. Such solutions have included, for example, pairs of rings joined by gripping portions, a tabbed ring to hold the bottle body with a second ring to hold the bottle neck joined by a gripping portion, a pair of tabbed rings joined by a gripping portion, and a handle attached to prehensile means. However, a need continues to remain for a handle which takes up minimum space in the refrigerator and on store shelves, which can accommodate variations in bottle body diameters, which is easy to place on and remove from the bottle, and which facilitates handling of such bottles.

SUMMARY OF THE INVENTION

An object of the present invention is to provide a reusable handle for bottles that may be readily placed on the bottle and readily removed from the bottle when the bottle is empty.

A further object of the present invention is to provide a reusable handle for bottles that does not take up excess space in storage, such as in a refrigerator.

A further object of the invention is to provide such a reusable handle that may be sold in a flat configuration.

A further object of the invention is to provide such a reusable handle that assists in the pouring operation to reduce slipping of the bottle and spilling of the bottle's contents.

A further object of the present invention is to provide a space saver design with a collapsible handle biased to return to its original shape extending out from bottle body.

A further object of the present invention is to provide a reusable handle for bottles that does not add appreciably to the height of the combined assembly.

A further object of the present invention is to provide such a reusable handle which will accommodate bottles of various diameters.

A further object of the present invention is to provide such a reusable handle which will accommodate bottles having tops of various sizes.

To fulfill the above-mentioned objectives, the present invention provides, in one aspect, a reusable handle in combination with a bottle. The combination includes a bottle having a generally cylindrical body of the type having a neck more narrow than the body of the bottle, and an annular neck flange, the generally cylindrical body having a cylindrical bottom portion. The combination further includes a reusable handle including an upwardly-diverging jacket encircling the bottom portion of the bottle body, a portion of the jacket being in contact with a portion of the bottom portion of the body, and a flexible arm extending upwardly from the jacket to a free end. The arm has a gripping portion between the free end and the jacket, and the free end having a bottle neck ring defining an opening through which the neck of the bottle extends. The bottle neck ring including a neck locking tab bearing against the bottle neck below the bottle neck flange. The neck locking tab biases the handle away from the bottle body, and is on the same side of the bottle as the gripping portion of the arm. The bottle neck ring includes a surface bearing against the bottle neck opposite the neck locking tab.

In another aspect, the present invention provides a flexible handle for use with a bottle of the type having a neck flange and a generally cylindrical body. The flexible handle comprises an upwardly diverging jacket for surrounding and holding a portion of the cylindrical body of the bottle. The jacket has a top edge and a bottom edge, and the jacket's diameter tapers between the top edge and the bottom edge. The flexible handle also includes a flexible arm extending upwardly from the top edge of the jacket. The flexible arm has a bottle neck ring at its free end defining an opening through which the neck of a bottle may pass for holding the neck of the bottle.

In yet another aspect, the present invention provides a reusable handle for use with bottles. The handle comprises a planar body having a top edge, an arcuate bottom edge, a pair of side edges between the top edge and bottom edge, wherein the planar body can be formed into an upwardly diverging jacket, and means for holding the planar body in the shape of an upwardly diverging jacket. The handle further includes a planar arm, co-planar with the planar body, extending from the top edge of the planar body, the planar arm having a longitudinal centerline aligned with the center of the bottom edge of the body. The planar arm has a bottle neck ring at its free end.

BRIEF DESCRIPTION OF THE DRAWINGS

FIG. 1 is a perspective view from the bottom of a bottle showing the handle of the present invention in place of the bottle.

FIG. 2 is a perspective view from the top of a bottle showing the handle of the present invention in place on the bottle.

FIG. 3 is a side view of a bottle showing the handle of the present invention in place on the bottle.

FIG. 4 is a side view of juxtaposed bottles showing depressed handles for convenience in storage.

DETAILED DESCRIPTION OF THE ILLUSTRATED EMBODIMENT

Figure 5:
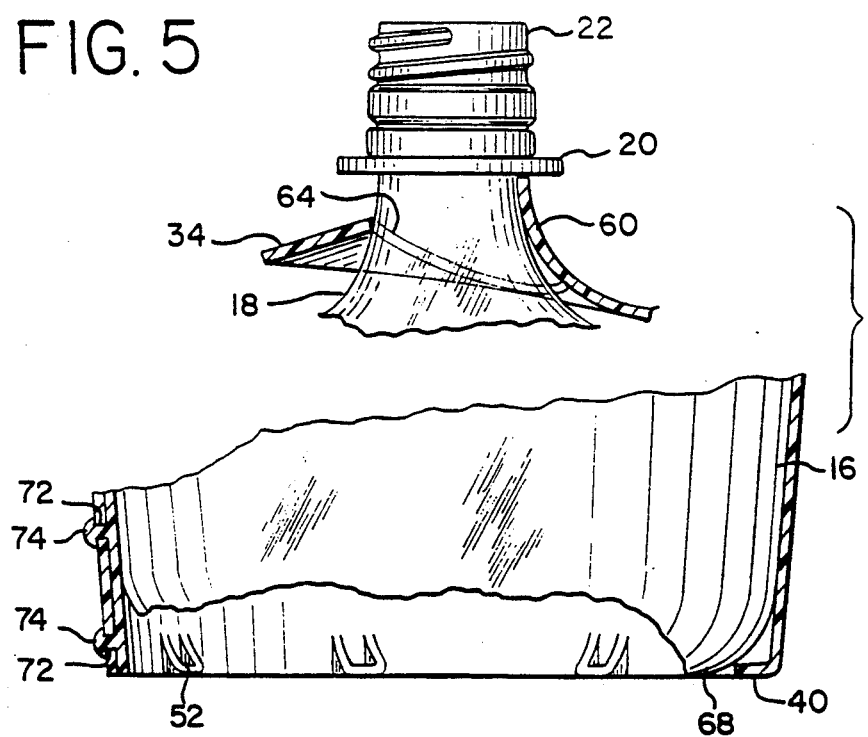
FIG. 5 is a partial cross-sectional view taken along line 5—5 of FIG. 1.

Referring to FIGS. 1 and 2, the reusable handle 10 of the present invention is illustrated in use on a bottle 12. The bottle 12 has a generally cylindrical body 14 with a cylindrical bottom portion 16. The top portion of the bottle 12 tapers to the relatively narrow neck 18 with an annular neck flange 20. Above the annular neck flange 20, the illustrated bottle 12 has a threaded top 22 which may be closed with a cap 24 as shown in FIG. 3. Such bottles are typically used as soft drink containers, and generally are sold in two and three liter sizes.

The reusable handle 10 comprises an upwardly diverging bonnet shaped jacket 30, integral with an arm 32 extending upwardly from the jacket 30. The arm 32 includes a bottle neck ring 34 at its free end, and a gripping portion 36 between the bottle neck ring and the jacket 30.

As illustrated in FIG. 3, the reusable handle's bonnet shaped jacket 30 has a bottom edge 40 and a pair of top edges 42 extending from the juncture of the arm 32 and the jacket 30. The jacket 30 is most wide at the juncture 44 of the jacket and the arm, and the top edges converge to the most narrow portion 46 of the jacket opposite the juncture of the jacket and arm. In the illustrated embodiment, the most narrow portion 46 of the jacket is about three-quarters of an inch wide, and is advantageous in placing the handle on the bottle and removing the handle from the bottle.

As shown in FIG. 1-4, the bonnet shaped jacket 30 encircles and tightly holds the cylindrical bottom portion 16 of the bottle 12. Because of the tapered configuration of the jacket 30, the handle may be used with bottles of varying diameters, and may be used for bottles having a bottom cup 50; the bottle will fit tightly within the jacket 30, and depending upon the diameter of the bottle used, the bottle will fit within the jacket at a relatively lower or higher position. To prevent the jacket from sliding upwardly on the bottle body, a plurality of ribs 52 are spaced around the interior of the jacket near the bottom edge 40 of the jacket. It should be understood that other means for reducing the effective inner diameter of the jacket at the bottom edge may be employed to serve this purpose.

As shown in FIGS. 1-4, the upwardly diverging jacket 30 also serves to bias the gripping portion 36 of the arm 32 away from the bottle 12. The gripping portion of the arm is also biased away from the bottle by the effect of a neck locking tab 60 of the bottle neck ring 34.

Figure 6:
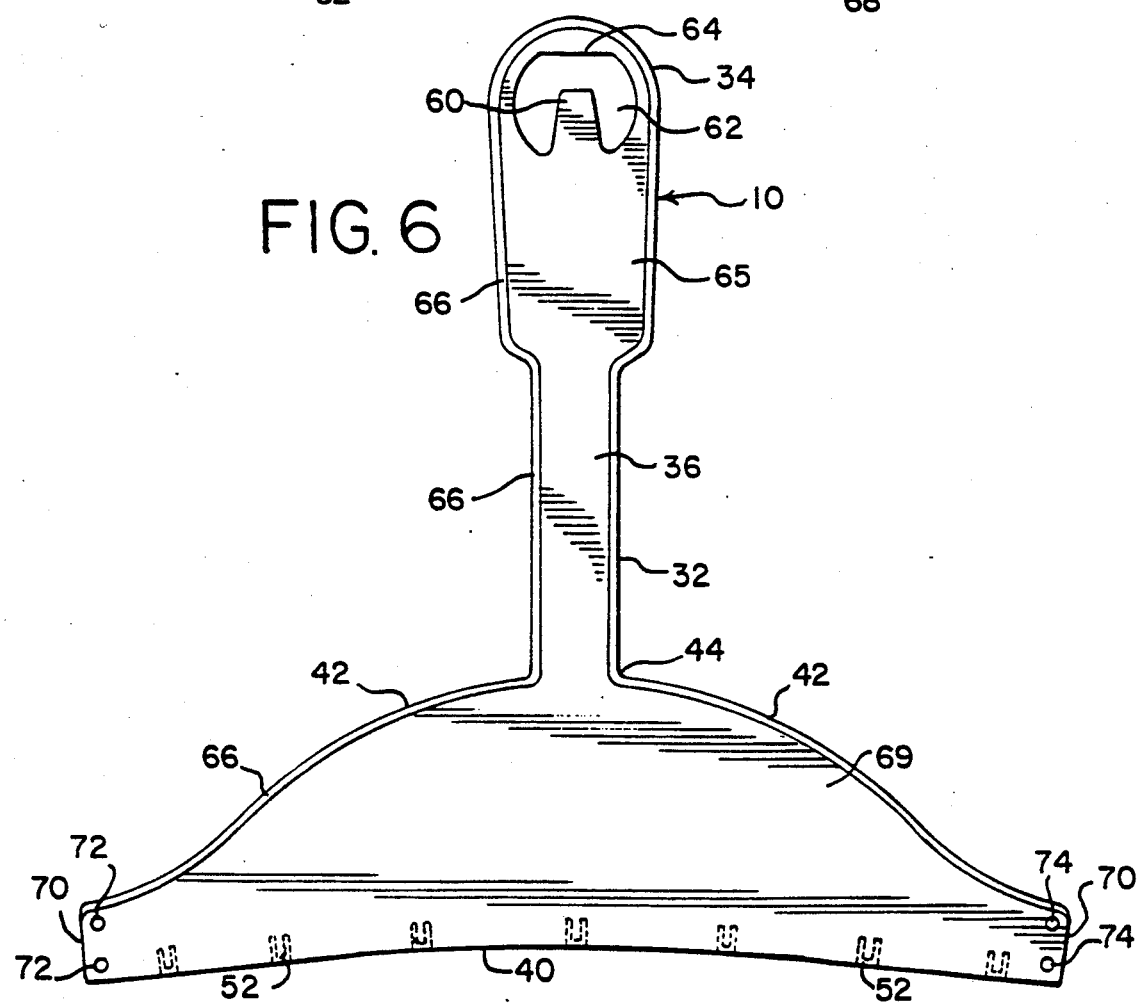
FIG. 6 is a plan view of the bottle handle of the present invention in its flat configuration.

The bottle neck ring 34 defines a opening 62 through which the neck flange 20 and threaded top 22 of the bottle extend. The neck locking tab 60 is aligned with the longitudinal centerline of the arm and extends into the opening 62 from the same side of the bottle as the gripping portion 36 of the arm. Opposite the neck locking tab 60, an edge 64 of the neck ring acts against the bottle neck 18. As shown in FIG. 6, the edge 64 is straight when the handle is not in place on a bottle, and the distance between the edge 64 and the end of the opposing neck locking tab 60 is less than the diameter of the bottle neck 18 so that when in place on the bottle, the bottle neck ring tightly holds the bottle neck. With this construction, both the edge 64 and the locking tab 60 apply pressure to opposite sides of the bottle neck, and the opening may be made large enough to accommodate bottles having various sized tops and caps without losing an adequate hold on the bottle neck.

In the illustrated embodiment, the gripping portion 36 of the arm is substantially flat, and has a reduced width. The gripping portion preferably has a width that facilitates comfortable gripping by he hand. In the illustrated embodiment, the gripping portion has a width of about one and one-quarter inches. The upper portion 65 of the arm 32 between the gripping portion and the bottle neck ring 34 has an increased width of over two inches in the illustrated embodiment, to define the gripping portion and to provide added stiffness for biasing of the gripping portion of the arm away from the bottle body. In addition, the upper portion 65 of the arm 32 may be used for carrying the bottle, and the neck locking tab 60 and edge 64 will lock the handle onto the bottle neck.

The arm, and the gripping portion in particular, may be textured on both surfaces to hinder slipping in handling. Furthermore, the exterior surface of the jacket may also be textured, although it is preferred that the interior surface of the jacket be smooth for gripping the bottle body. For comfort in handling, the illustrated embodiment includes a rounded bead 66 extending around the arm and along the top edges 42 of the jacket.

The arm 32 is preferably flexible and resilient. As shown in FIG. 4, the flexibility of the arm aids in storage of the combined bottle and handle. When pushed against another container, or against, for example, the walls of a refrigerator, the arm bends inwardly toward the cylindrical body 14 of the bottle 12, or collapses, minimizing the necessary storage space. Because of the biasing by the jacket and neck locking tab and the resilience of the arm, the arm will return to the normal position shown in FIG. 3 when pressure on the arm is removed.

To place the illustrated handle on a bottle, the top of the bottle is inserted through the opening 62 in the bottle neck ring 34, and the bottle neck ring is positioned on the neck 18 of the bottle, with the neck locking tab 60 acting against the bottle neck 18 immediately below the annular neck flange 20. The arm 32 and jacket 30 are then extended downward and brought against the bottle body. The narrow portion 46 of the jacket is then brought forward toward the opposite side of the bottle. In this position, the top edges of most narrow portion 46 of the jacket are about even with the bottom of the bottle. The jacket is then slipped upward on the bottle body until a snug fit is obtained. The weight of the bottle will also tend to force the bottle downward into the tapered jacket until stopped by the diameter of the jacket or by the ribs 52. So positioned, the gripping portion 36 of the arm 32 will be spaced from the bottle body, allowing the user to grasp the gripping portion and pour from the bottle. For stability and ease of storage, it is preferred that the bottle fit closely to the bottom edge 40 of the jacket, and the jacket should be dimensioned to allow for this fit. Stability will also be enhanced upon refrigeration, since the cold temperatures will cause the plastic handle to stiffen.

When the handle is used for pouring, lifting the combined handle and bottle from the gripping portion of the arm, the edge 64 of the neck ring will be pulled more tightly against the bottle neck and the jacket 30 will be pulled more tightly up against the bottom portion of the bottle body. The heavier the bottle, the greater the pressure applied to the bottle neck and the bottom portion of the bottle body, thereby ensuring that the bottle is securely held by the handle.

With the handle in place on the bottle, removal of the bottle cap from the bottle top will also be facilitated. The bottle can be stabilized by holding the arm 32 of the handle while twisting the bottle cap off of the bottle.

To remove the handle from the bottle, the most narrow part 46 of the jacket is brought downward and back until the bottom of the bottle is free from the jacket. The bottle neck ring is then pulled up off of the top of the bottle.

For convenience and cost savings in manufacture, distribution, sale and storage, it is preferred that the handle be made in a flat configuration as shown in FIG. 6. With the handles made in such a flat configuration, many handles may be easily stacked for efficient shipping, storage and display; for example, many flat handles may be stacked and packed per shipping carton for efficient shipping. The handles may be sold in the flat configuration, with final assembly to be done by the purchaser, as described below.

As shown in FIG. 6, the handle comprises a planar body 69 with top edges 42 and a bottom edge 40. The arm 32 is co-planar with the body 69, extending upwardly from between the top edges. The longitudinal centerline of the arm 32 is aligned with the center of the bottom edge. The bottom edge 40 is arcuate or curved, and has a relatively large radius of curvature of about twenty-nine inches, curving away from the arm. The bottom edge 40 terminates in two side edges 70. The side edges 70 are angled slightly with respect to the longitudinal centerline of the arm 32.

The planar body 69 is formable into the upwardly diverging jacket, and means for holding the planar body in the shape of an upwardly diverging jacket are provided. In the illustrated embodiment, the holding means comprises a pair of holes 72 near one side edge, and a mating pair of pegs 74 near the opposite side edge, both aligned with the side edges. The holes and pegs are adapted to be snap fit together to hold the jacket in the upwardly diverging bonnet shape shown in FIGS. 1–4. The curvature of the bottom edge and slight angle of the holding means aid in defining and fixing the desired tapered bonnet shape, and also serve to bias the gripping portion of the arm away from the bottle body, while not detracting from the desired flat seating surface for the combined bottle and handle.

As shown in FIG. 6, the top edges 42 of the jacket curve downward toward the bottom edge 40 from the juncture 44 of the jacket and arm, with radii of curvature of about seven inches, and then curve in the opposite direction, with radii of curvature of about three inches, so that the top and bottom edges are nearly parallel to each other near the side edges.

In the illustrated embodiment, the distance between the junctures of the top edges and side edges is about fourteen inches, which provides an appropriately sized bonnet shaped jacket for conventional two liter bottles. The jacket 30 is relatively wide near the juncture 44 of the arm and jacket, about four inches wide in the illustrated embodiment, providing a relatively large panel 80 for advertising or promotional use. The panel 80 can be hot stamped, pad printed or silk screened with advertising or promotional messages; these processes are facilitated by the present invention since the printing or stamping may be done on the flat handle during or after initial manufacture of the handle, rather than on the curved surface defined by the panel 80 in the final configuration, as shown in FIG. 1.

The gripping portion 36 of the arm has a length of about four and five-sixteenths inches and is one and one-quarter inches wide. The handle has an overall length from the free end of the arm to the center of the bottom edge of about thirteen inches. The thickness of the handle is 0.0435 inches, except for the rounded beads, which are about one-eighth inch wide and about one-sixteenth inch high.

The combined lengths of the arm 32 and jacket 30, from the straight edge 64 of the bottle neck ring 34 to the bottom edge 40 of the jacket 30 are greater than the height of the bottle from the base 68 to the annular neck flange 20, and should be great enough so that the gripping portion 36 of the arm is sufficiently spaced from the body 14 of the bottle 12 to allow for the user's fingers to fit between the arm and the body of the bottle. Furthermore, the length should be great enough to allow for easy placement and removal of the jacket 30 on the bottle body. However, the length should be short enough to keep the gripping portion relatively close to the bottle body so that the center of gravity remains close to the bottle body for ease in pouring. For a conventional two liter bottle, this dimension is about twelve and one-half inches.

While the illustrative dimensions have been given for a handle to be used with conventional two-liter bottles, it should be understood that the handle dimensions may be scaled upward for use in conjunction with three liter bottles. In either case, the tapered jacket can accommodate variations in bottle body diameter, and the combination of the edge 64, neck locking tab 60 of the neck ring 34 and a relatively large opening 62 in the bottle neck ring can accommodate variations in the diameters of the bottle neck, bottle top and bottle cap.

The handle of the present invention may be made by injection molding of plastic. In the illustrated embodiment, the entire handle is integral, and is made of a relatively thin, flexible, resilient plastic material such as high density polyethylene. Generally, it is desirable that the handle be made of material that is durable, detergent and dishwasher safe, abrasion resistant and that possesses a high impact strength.

The handle of the present invention may be sold to the ultimate consumer in the flat configuration illustrated in FIG. 6. The consumer may then simply bring the two side edges 70 together to form the bonnet shaped jacket 30, and snap the pegs 74 into the holes 72 to maintain this shape as illustrated in FIGS. 1–4. So shaped, the arcuate bottom edge 40 of the handle will sit flat on a flat surface, such as a tabletop or refrigerator shelf, and the gripping portion of the arm will be biased away from the vertical. For flat storage of the handle, the consumer need only unsnap the pegs 74 from the holes 72, and the bias of the plastic will return the jacket to the flat configuration.

Although this invention has been disclosed and described in its preferred form with a certain degree of particularity, it is understood that the present disclosure of the preferred form is only by way of example and that numerous changes in the details of operation and in the combination and arrangement of parts may be made without departing from the spirit and scope of the invention as hereinafter claimed.

I claim:

1. A reusable handle in combination with a bottle, the combination including:
   a) a bottle having a generally cylindrical body of the type having a neck more narrow than the body of the bottle, and an annular neck flange, the generally cylindrical body having a cylindrical bottom portion;
   b) a reusable handle including
      1) an upwardly-diverging jacket encircling the bottom portion of the bottle body, a portion of the jacket being in contact with a portion of the bottom portion of the body;

2) a flexible arm extending upwardly from the jacket to a free end, the arm having a gripping portion between the free end and the jacket, the free end having a bottle neck ring defining an opening through which the neck of the bottle extends, the bottle neck ring including a neck locking tab bearing against the bottle neck below the bottle neck flange, the neck locking tab being on the same side of the bottle as the gripping portion of the arm, the bottle neck ring including a surface bearing against the bottle neck opposite the neck locking tab.

2. The combination claimed in claim 1 wherein the gripping portion of the arm is spaced from the body of the bottle.

3. The combination claimed in claim 1 wherein the jacket has a bottom edge and a pair of top edges extending from the juncture of the arm and the jacket, the top edges converging toward the bottom edge so that the jacket is most narrow on the side of the bottle opposite the arm.

4. The combination claimed in claim 3 wherein the jacket tapers from the top edges to the bottom edge 5. The combination claimed in claim 1 further comprising means for preventing the jacket from sliding upwardly on the bottle body.

6. The combination claimed in claim 5 wherein the jacket has a bottom edge and the means for preventing the jacket from sliding upwardly on the bottle body comprises a plurality of ribs disposed on the interior of the jacket near the bottom edge.

7. The combination claimed in claim 1 wherein the jacket has a bottom edge and the length of the handle between the bottom edge and the neck locking tab is greater than the height of the bottle to the neck flange.

8. A flexible handle for use with a bottle of the type having a neck flange and a generally cylindrical body, the flexible handle comprising:
 an upwardly diverging jacket for surrounding and holding a portion of the cylindrical body of the bottle, the jacket having a top edge and a bottom edge, wherein the jacket's inner diameter tapers between the top edge and the bottom edge, the jacket further including a most narrow part and a diametrically opposed most wide part; and
 a flexible arm extending upwardly from the top edge of the jacket, the flexible arm having a bottle neck ring at its free end defining an opening through which the neck of a bottle may pass for holding the neck of the bottle;
 wherein the most wide part of the jacket is at the juncture of the flexible arm and the jacket, and the top edge of the jacket converges toward the bottom edge of the jacket from the most wide part of the jacket to the most narrow part of the jacket.

9. The flexible handle claimed in claim 8 wherein the flexible arm includes a neck locking tab extending along the longitudinal centerline of the arm away from the jacket into the opening defined by the bottle neck ring.

10. The flexible handle claimed in claim 9 wherein the bottle neck ring includes a straight edge opposite the neck locking tab.

11. The flexible handle claimed in claim 10 wherein the distance between the straight edge of the bottle neck ring and the bottom edge of the jacket is at least twelve inches.

12. A reusable handle for use with bottles, the handle comprising:
 a planar body having a top edge, a curved bottom edge, a pair of side edges between the top edge and bottom edge, wherein the planar body is formable into an upwardly diverging jacket, and means for holding the planar body in the shape of an upwardly diverging jacket; and
 a planar arm, co-planar with the planar body, extending from the top edge of the planar body, the planar arm having a longitudinal centerline aligned with the center of the bottom edge of the body, the planar arm having a bottle neck ring at its free end.

13. The reusable handle claimed in claim 12 wherein the planar arm divides the top edge into two mirror image halves, and wherein the top edge is curved.

14. The reusable handle as claimed in claim 13 wherein the halves of the top edge have radii of curvature less than the radius of curvature of the bottom edge.

15. The reusable handle as claimed in claim 12 wherein the planar arm divides the top edge into two halves, the two halves of the top edge converging from the planar arm toward the bottom edge so that the body narrows toward the side edges.

16. The reusable handle as claimed in claim 12 wherein the bottle neck ring includes a straight edge.

17. The reusable handle as claimed in claim 12 wherein the bottle neck ring defines an opening and includes a neck locking tab extending along the longitudinal centerline of the arm into the opening.

18. The reusable handle as claimed in claim 17, wherein the bottle neck ring includes a straight edge opposite the neck locking tab.

19. The reusable handle as claimed in claim 18 wherein the distance between the straight edge of the bottle neck ring and the bottom edge is about twelve and one-half inches.

* * * * *